(12) United States Patent
Fisher et al.

(10) Patent No.: US 8,196,047 B2
(45) Date of Patent: Jun. 5, 2012

(54) FLEXIBLE VISUALIZATION FOR SERVICES

(75) Inventors: Danyel Fisher, Seattle, WA (US); Aaron Hoff, Kirkland, WA (US); George Robertson, Northeast Harbor, ME (US); Heather Warncke, Seattle, WA (US); Mary Czerwinski, Kirkland, WA (US); Albert Greenberg, Seattle, WA (US); Dave Maltz, Bellevue, WA (US); Xiaoyu Wang, Charlotte, NC (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 12/356,084

(22) Filed: Jan. 20, 2009

(65) Prior Publication Data

US 2010/0185961 A1    Jul. 22, 2010

(51) Int. Cl.
*G06F 15/177* (2006.01)
*G06F 15/16* (2006.01)
(52) U.S. Cl. ........ 715/735; 715/734; 715/736; 715/762; 715/763; 715/771
(58) Field of Classification Search .......... 715/710–715, 715/751, 762, 763, 771, 772, 734–736
See application file for complete search history.

(56) References Cited

U.S. PATENT DOCUMENTS

| | | | |
|---|---|---|---|
| 5,877,766 A * | 3/1999 | Bates et al. ................... | 715/854 |
| 6,160,549 A | 12/2000 | Touma et al. | |
| 6,282,697 B1 | 8/2001 | Fables et al. | |
| 6,980,978 B2 | 12/2005 | Charron et al. | |
| 7,689,583 B2 * | 3/2010 | Bozich et al. ................. | 707/803 |
| 2002/0070953 A1 * | 6/2002 | Barg et al. ..................... | 345/700 |
| 2003/0158855 A1 * | 8/2003 | Farnham et al. .............. | 707/102 |
| 2004/0003042 A1 * | 1/2004 | Horvitz et al. ................ | 709/204 |
| 2004/0030741 A1 * | 2/2004 | Wolton et al. ................ | 709/202 |
| 2004/0054670 A1 * | 3/2004 | Noff et al. ......................... | 707/3 |
| 2005/0071482 A1 * | 3/2005 | Gopisetty et al. ............ | 709/229 |
| 2005/0078172 A1 * | 4/2005 | Harville et al. ............ | 348/14.09 |
| 2007/0005382 A1 | 1/2007 | Sayers | |
| 2010/0110932 A1 * | 5/2010 | Doran et al. .................. | 370/254 |
| 2010/0153482 A1 * | 6/2010 | Kim et al. ..................... | 709/201 |

OTHER PUBLICATIONS

Wanger Jascha, "Managing Data Center Functions with Open Source Tools", Retrieved at<<http://localareasecurity.com/downloads/pdf/OSC_Data_Center.pdf>>, pp. 5.

"Visualization", Retrieved at<<http://web.rackwise.com/Solutions/Visualization/tabid/190/Default.aspx>>, p. 1.

Cammarano, et al. "Visualization of Heterogeneous Data", Retrieved at<<http://www.stanford.edu/~klingner/publications/Visualization_of_Heterogeneous_Data.pdf>>, Mar. 31, 2007, pp. 8.

Bonnassieux, et al."MapCenter: An Open Grid Status Visualization Tool", Retrieved at<<http://www.urec.cnrs.fr/IMG/pdf/mapcenter.02.Louisville.pdf>>, pp. 7.

(Continued)

*Primary Examiner* — Nicholas Augustine

(57) ABSTRACT

Techniques are described for generating a user interface for visualizing a cloud service based on status and performance data of the cloud service obtained from data stores. A configuration file including declarative code may declare particular queries to status/performance data sources. The configuration file may also declare particular queries to topology data sources to obtain topology information. In accordance with the obtained information, objects representing the cloud service may be displayed. The objects correspond to particular hardware and software components, or logical grouping thereof, that are identified by the topology information.

20 Claims, 8 Drawing Sheets

OTHER PUBLICATIONS

"Monitoring your Data Center using Apache and Ganglia", Retrieved at<<http://2008.utosc.com/presentation/99/>>, Aug. 28-30, 2008, pp. 3.

Erlacher Markus,"System Center and the Virtualized Datacenter", Retrieved at<<http://www.digicomp.ch/misc/documents/virtualday/2008/System%20Center%20and%20the%20virtualized%20Datacenter.pdf>>, pp. 24.

Bodik, et al. "Advanced Tools for Operators at Amazon.com", Retrieved at<<http://www.aqualab.cs.northwestern.edu/HotACI/papers/bodik-amazon.pdf>>, pp. 5.

Dourish, et al."The Doctor is In: Helping End-Users Understand the Health of Distributed Systems", Retrieved at<<http://citeseerx.ist.psu.edu/viewdoc/summary?doi=10.1.1.26.525>>, pp. 12.

MacKinlay, et al."Show Me: Automatic Presentation for Visual Analysis", Retrieved at<<http://ieeexplore.ieee.org/xpl/freeabs_all.jsp?arnumber=4376133>>, IEEE Transactions on Visualization and Computer Graphics, vol. 13, No. 6, Nov./Dec. 2007, pp. 1137-1144.

Moses, et al."Algorithm Visualization for Distributed Environments", Retrieved at<<http://ieeexplore.ieee.org/xpl/freeabs_all.jsp?arnumber=729561>>, pp. 8.

Munzner, et al."Visualizing the Global Topology of the MBone", Retrieved at<<http://graphics.stanford.edu/papers/mbone/>>, Proceedings of the 1996 IEEE Symposium on Information Visualization, Oct. 28-29, 1996, San Francisco, CA, pp. 85-92.

Robertson, et al."Animated Visualization of Multiple Intersecting Hierarchies", Retrieved at<<http://research.microsoft.com/~marycz/IV2002poly.pdf>>, To appear in Journal of Information Visualization, vol. 1, No. 1, Mar. 2002, pp. 1-23.

"Animated Exploration of Dynamic Graphs with Radial Layout", Retrieved at<<http://ieeexplore.ieee.org/xpl/freeabs_all.jsp?arnumber=963279>>.

* cited by examiner

```
         <OpsVisRoot>
302 ——<TopoSQLDatasource Name="LoadFrontEnd"
         Connection="Server=SQLUTIL;Database=OpsVis;" >
           <TopoSQLDatasource.Query>
             SELECT AC AS KeyColumn, FrontEnd
             FROM BackendInfrastructure
             WHERE AC = '{0}'
           </TopoSQLDatasource.Query>

304 ——<StatusSQLDatasource Name="MachineCPUTimes"
         ApplyTo="AC1FrontEnd, AC2FrontEnd""
         RefreshFrequency="10" DataType="Value"
         MappingFrom="CPUTIME" MappingTo="Background"
         MapConverter="ValueToBrightness"
         Connection="Server=SAMPLERFARM;Database=Samples;"
         AggregateWith="Avg" MinValue="25" MaxValue="35">
            <StatusSQLDatasource.Query>
               SELECT Computer.Name AS KeyColumn,
                 snd.SampleValue AS CPUTime
               FROM SampledNumericData snd
               WHERE SampleType='CPU'
            </StatusSQLDatasource.Query>
           </StatusSQLDatasource>

306 ——<OpsVisRoot.ModelCollection>
             <FrontEndModel Name="AC1FrontEnd"
         TopoDatasource="LoadFrontEnd"   Param="AC1"/>
             <FrontEndModel Name="AC2FrontEnd"
         TopoDatasource="LoadFrontEnd"   Param="AC2"/>
           </OpsVisRoot.ModelCollection>
         </OpsVisRoot>
                        300
```

FIG. 5

FLEXIBLE VISUALIZATION FOR SERVICES

BACKGROUND

Web services such as Facebook and Amazon appear to users as a unified service. Behind the user's view, these types of services are built on complex systems of components such as routers, switches, servers and server clusters, and databases, to name a few. These components combine to present a single front-end and the appearance of a unified service. These types of services are distributed systems and may be built by integrating distributed subsystems. Each subsystem may be specialized to a small number of functions. One subsystem might manage user authentication, while another handles file search, and yet another may handle data storage. These distributed systems, which may be composed of hundreds or thousands of machines, are deployed within or across large data centers. Such distributed systems are often referred to as cloud services.

Users expect cloud services to be available and responsive. However, within a data center, even under normal operating conditions, given the scale and complexity of the hardware and software of a cloud service, at any one time many hardware or software components may be in various degraded states such as failing, undergoing upgrade, or failed. Typically, cloud services are built with duplication and resilience to minimize the impact of these problems on performance or availability. Nonetheless, components of a cloud service can cause the cloud service to fail. For example, failure of a component involved in an unanticipated dependency can lead to a significant service outage, or too many critical components may fail.

Operators who monitor and manage cloud services, and developers who build tools for operators, may have goals such as proactively identifying problems before or as they occur, localizing and diagnosing problems that arise in the field, and assuring unanticipated failures are not triggered during a service upgrade (during which time the system is particularly vulnerable). However, current tools for operators of these systems are inflexible, and in general do not allow flexible visualization at varying scales, including visualization of very large scale services/systems and visualization through varying levels of size and organization down to individual machine and software components. Current tools make use of elements such as lengthy lists or tree-views of individual components, which are impractical for visualizing cloud services that may involve thousands of components. Generally, tools that can visualize individual component machines/servers cannot visualize how such components are organized or how they are functioning as a unit. Tools that can provide a high level view of a service do not provide views into individual machines/servers. Furthermore, such tools are incapable of reflecting the many levels of organization and the varying relationships between organizational units. Even in the case of tools that allow navigation of a hierarchy, such tools do not do not aggregate data in a way that reflects a system's organization. For example, there are no visualization tools that aggregate, in a flexible way, information about clusters of machines or information about groups of clusters.

Not only are current tools inflexible, but they also fail to take advantage of information that may be available. A wide variety of configuration and usage data may be available for viewing behind each component of a cloud service. As new features are regularly added to a service, corresponding new sets of logging features grow more numerous and become unmanageable. In sum, operators are not lacking in data about their cloud services. However, they are lacking tools for gaining rapid insight from the mass of available data.

Operators of cloud services aim to identify anomalies and problems but a high degree of replication and a high degree of natural variability in workloads of components can make this difficult. It may be that one server in a cluster is running slow: perhaps its disk is failing, and disk seeks are being retried. A set of databases may be overloaded due to specific content becoming popular. Workload aberrations may cause sharp increases in the computational loads within a cluster. Response times may increase because of increased complexity of answering the individual requests. The types of systemic problems are limitless. Operators lack tools for identifying anomalies and problems across distributed systems, and in particular correlating events and trends across the highly replicated structure of these services where variations over time are more informative than baseline averages.

Mathematical and statistical approaches have been used to address this correlation and anomaly detection problem. The mathematical approach, while useful, does not take advantage of the human mind's ability to rapidly synthesize visual information. Techniques described below relate to allowing developers of cloud services to easily build effective, customized visualizations of cloud service configuration, behavior and health.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for generating a user interface for visualizing a cloud service based on topology, status, and performance data of the cloud service obtained from data stores. Independently, the data stores may be repeatedly updated with status and performance data about and from machine servers and software components of the cloud service. The data stores may also store information about the topology of the cloud service. A configuration file including declarative code may declare particular queries to particular status/performance data sources. The configuration file may also declare particular queries to topology data sources to obtain topology information indicating logical groupings of the hardware and software components, and information indicating relations between the logical groupings. In accordance with the topology information, objects may be instantiated and linked to the topology information by the configuration file. The objects correspond to particular hardware and software components, or logical grouping thereof, that are identified by the topology information. Based on declarations in the configuration file that link objects to user interface elements, a user interface element may be generated for each of the instantiated objects. Indicia of the status and/or performance data about the software and hardware components of the cloud service may be displayed in the user interface elements that represent the respective software and hardware components. A visualization engine may read and execute the configuration file. The visualization engine may be configured to execute arbitrary declarative configuration files.

Many of the attendant features will be explained below with reference to the following detailed description considered in connection with the accompanying drawings.

BRIEF DESCRIPTION OF THE DRAWINGS

The present description will be better understood from the following detailed description read in light of the accompa

FIG. 5 shows an example configuration file.

DETAILED DESCRIPTION

Overview

Embodiments of a system discussed below relate to allowing developers of cloud services to easily build effective, customized visualizations of cloud service configuration, behavior and health. The system lets developers and service providers view a system by atomic object (e.g., database, server), composite object (e.g., set of replicated databases), and by dependencies (e.g., servers and clusters affinitized to specific content). Usage and/or performance data of the components may be overlaid on the visualization. Variations and outliers in usage statistics may be visually highlighted, with the nature and intensity of the highlighting under user control. Embodiments of the system provide flexible integration of diverse data in diverse formats collected from stock monitoring tools. The following description will proceed first with discussion of a case example to which embodiments of the system are applied, followed by processes performed by embodiments of the system, then discussion of an example user interface for a monitoring tool and an example configuration file for configuring a monitoring visualization.

Example Cloud Service: ABCH

The Address Book Clearing House, or ABCH, is a medium-sized cloud service, which stores users' address books and presence information. It maintains several hundred back-end databases, and around one hundred front-end servers that service requests for users' address books from web-based email, instant messaging tools, and other sources.

Like many but not all cloud services, ABCH has a front-end/back-end architecture, with some added complexity. An external request specifies a given users' address book to be retrieved. The request arrives at one of three affinity clusters of front-end server machines. Each cluster has information of roughly one-third of all address book entries; if the request arrives at the wrong cluster, it is rerouted to another cluster. The front-end servers look up which back-end database has the information about the requesting user and forward the request to the affiliated back-end database. On the back-end, database servers each store a number of databases, in a structure of mirrored replicas; servers are organized in sets that share backups with each other. ABCH's topology changes regularly: clusters are re-organized for better balance or to make more space available.

Like many cloud services, ABCH is built by combining together diverse components. As a result, the service does not have a single tool from which the status of the service can be viewed. Instead, prior to the embodiments described herein, an operator would view separate tools for each of the components, one after the other, and the information derived from them would be manually integrated and interpreted by the operator.

System Overview

Figure 1:
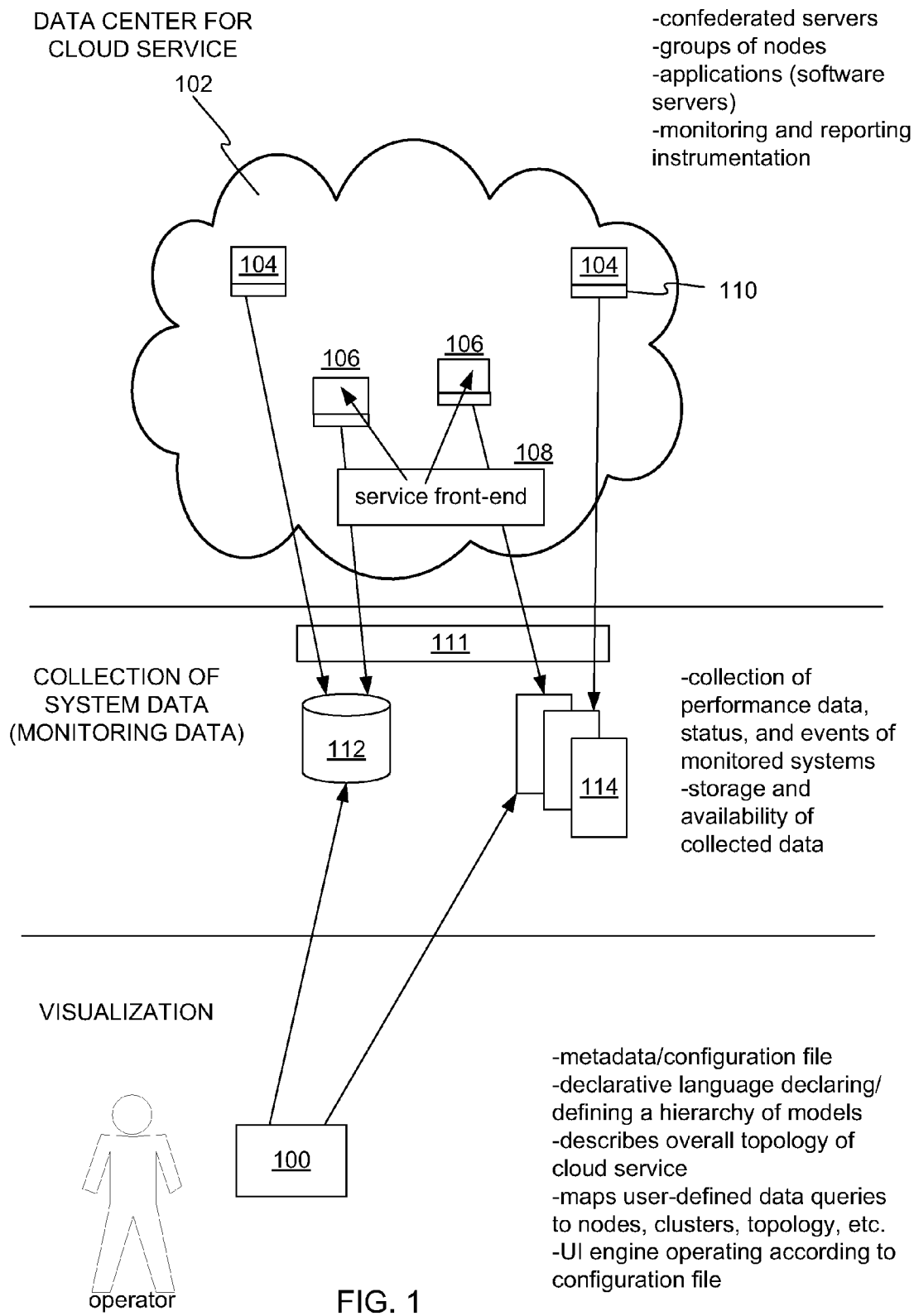
- FIG. 1 shows a general context for a system for visualizing a cloud service and its components using various sources of already available data.

FIG. 1 shows a general context for a system 100 for visualizing a cloud service 102 and its components using various sources of already available data, e.g., data collected by a variety of pre-existing (off-the-shelf) data collectors. At the top of FIG. 1 is an example cloud service 102 that may typify any past or future cloud service. Cloud service 102 may have components such as individual back-end servers 104 and front-end servers 106 that present a consistent front-end interface 108. Complexities such as clusters (e.g. of servers, databases, etc.), sub clusters, mirror or stand-in relations, specific types of servers such as database servers, web servers, name servers, directory servers, object databases, middleware, backup systems, etc., are not shown but may be present.

The components of the cloud service 102 may be equipped with existing data collection software 110, e.g. agents, scripts, etc., that collect may collect various usage data from the components of the cloud service 100. Examples of suitable data collection systems are Microsoft's MOM and HP Operations Center, among others. Such systems may collect data on CPU usage, software updates, memory usage, network bandwidth usage, rate of network connections, database server statistics, faults or reboots, idle time, software manifests, web server response times, CPU utilization, database server response times, and many others. Regardless of the type or types of data collection systems used, data is collected and stored in repositories such as databases 112, flat files 114, spreadsheets, and other means. A collection service 111 may or may not be present to facilitate data collection, for example, by pulling data from components and pushing the data to data stores such as databases 112 or flat files 114. In some cases, components may push data directly to data stores. Embodiments described herein make use of the collected system status and performance data without having to modify existing collection systems. Topology information, such as the identity of components and their relations (e.g., membership in a cluster or group) may also be collected and stored. Often, topology information may be inputted manually.

Separate from the data collection and storage is the cloud service visualization system 100. The visualization system 100 roughly follows the model-view-controller pattern, where the model is formed from the collected system performance, status, and topology data, and the visualization system 100 provides user interface or view facilities according to a configuration file that declaratively describes the architecture/topology and components of the cloud service whose data is to be visualized, and also describes how it is to be visualized. The visualization system 100 implements a declarative language (which the configuration file is written in), and therefore control logic is implicit in the visualization system 100. The visualization system 100 may in practice be any variety of one or more computers possibly working in combination, each having storage and processor(s) for executing software which may be provided from the storage and/or from some computer readable storage media.

Figure 2:
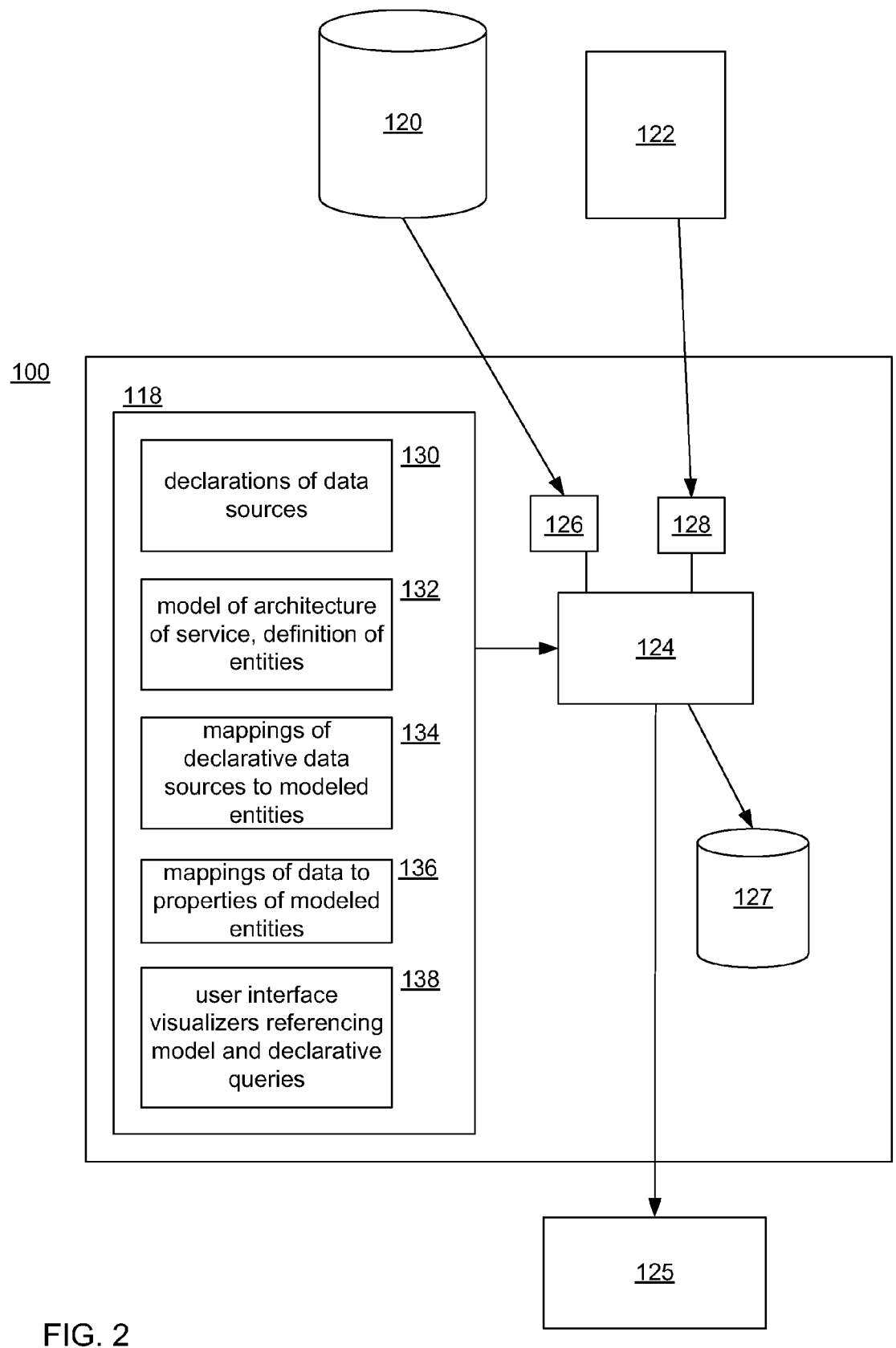
FIG. 2 shows the visualization system in greater detail.

FIG. 2 shows visualization system 100 in greater detail. Collected system performance data is accessed from any variety of data stores 120, 122. The data stores 120, 122 are not integrated into the visualization system 100 but rather are shared resources accessible other applications or clients. The visualization system 100 is implemented as software on one or more computer systems (not shown). The main component of the visualization system 100 is a visualization engine 124 that executes a configuration file 118 (also referred to as a program, though declarative in nature). The visualization engine 124 includes facilities for parsing declarative code in the configuration file 118 and executing instructions according to the declarative code therein to produce a custom user interface 125.

Figure 6:
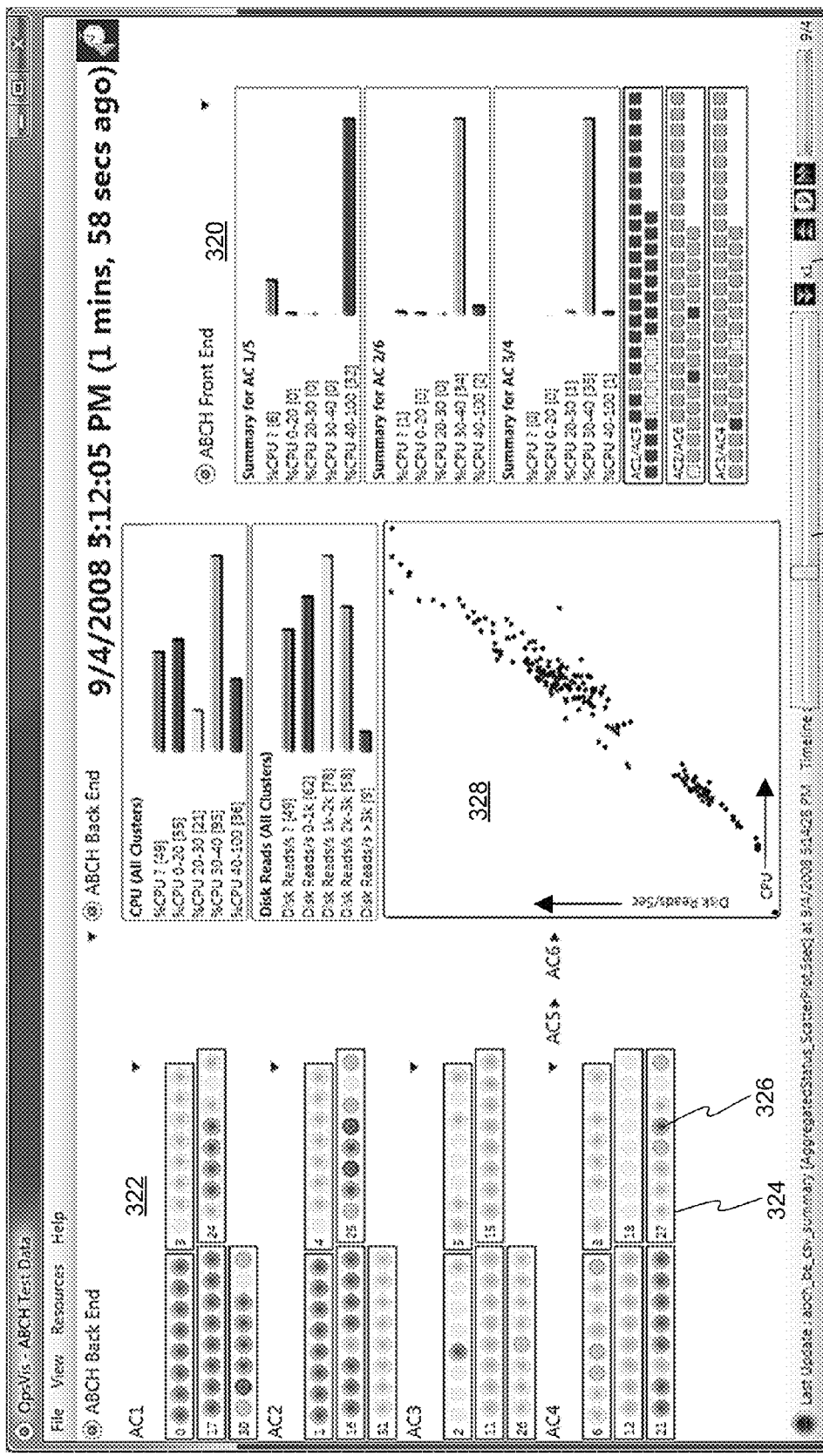
FIG. 6 shows a display of an example user interface (visualization) in operation at the ABCH cloud service.
Figure 7:
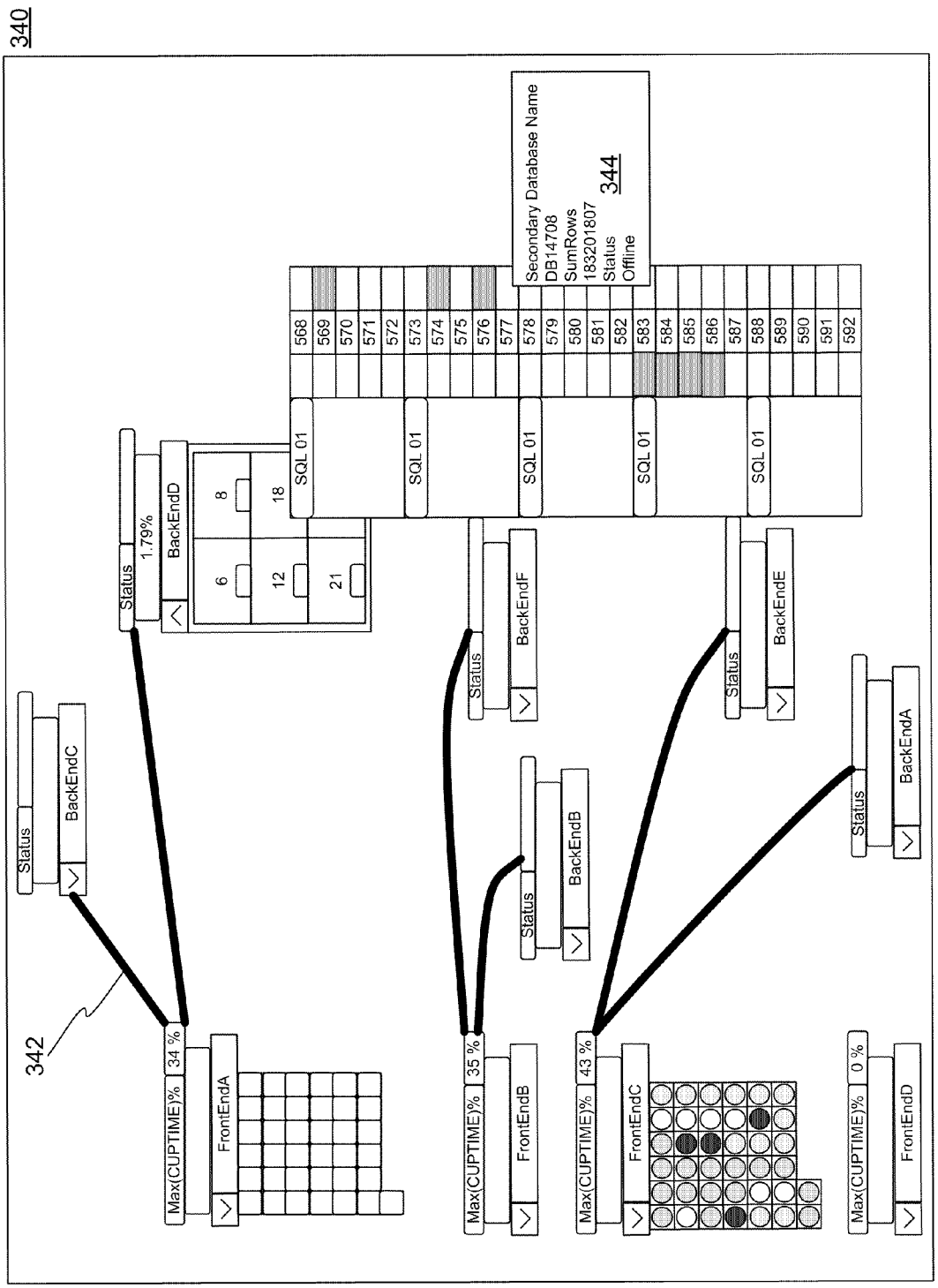
FIG. 7 shows another example of a user interface.

Declarative code, for example XAML, is used to specify the data and contents of a program and what the program is to accomplish, without specifying a logical flow of the program. The program portions examples provided herein are written in an XML-based markup language similar to XAML. A declarative program typically declares classes, objects, relations, datasources, instantiates objects (e.g., an object graph), specifies properties of objects, defines datatypes, and so on. Those of ordinary skill may refer elsewhere for guidance on implementing a declarative language and a compiler or runtime environment (engines) for executing code of the declarative language. FIGS. 5 and 8-19, discussed later, show example configuration files. FIGS. 6 and 7, also discussed later, show example user interfaces generated by visualization engine 124 according to configuration files.

The visualization engine 124 also has facilities for abstracting data communication. A visualization program or configuration file may specify different data sources such as a database server or flat log file. The visualization system 100 may have or invoke adapters 126 or data source connectors 128 (data intermediaries) to enable the visualization engine 124 to query for data from a data source specified by a configuration file, thus allowing the configuration file to deal with collected data about a cloud service and its components without concern for the underlying storage of the data. Furthermore, a configuration file can refer to arbitrary types and instances of data stores independent of user interface and object model declarations in the configuration file; a same configuration file and corresponding visualization can be executed for arbitrary cloud service instances or arbitrary sources of data about a cloud service. As components or topology of the cloud service change, the changes may be reflected in the displayed visualization without having to modify the configuration file. Data retrieved by the visualization engine 124 may be stored in a historical archive 127 for later "rewind" and "replay", much like a media player may rewind media that is being played.

The declarative program or configuration file 118 may include a number of types of elements which may include declarations of data sources 130 (e.g., particular queries of particular databases), definition 132 of a model of entities (e.g., clusters, servers machines, database servers, etc.) of the cloud system whose data is to be visualized, mappings 134 of the data sources to the modeled entities, mappings of data to a model and/or properties of modeled entities, and user specification of interface visualizers 138 defining a user interface or visualization and visual properties of user interface elements that make up the visualization. As will be seen further below, these types of declarations may be specified in the configuration file 118 with corresponding elements and element parameters of a markup language.

Example Data Model

Figure 3:
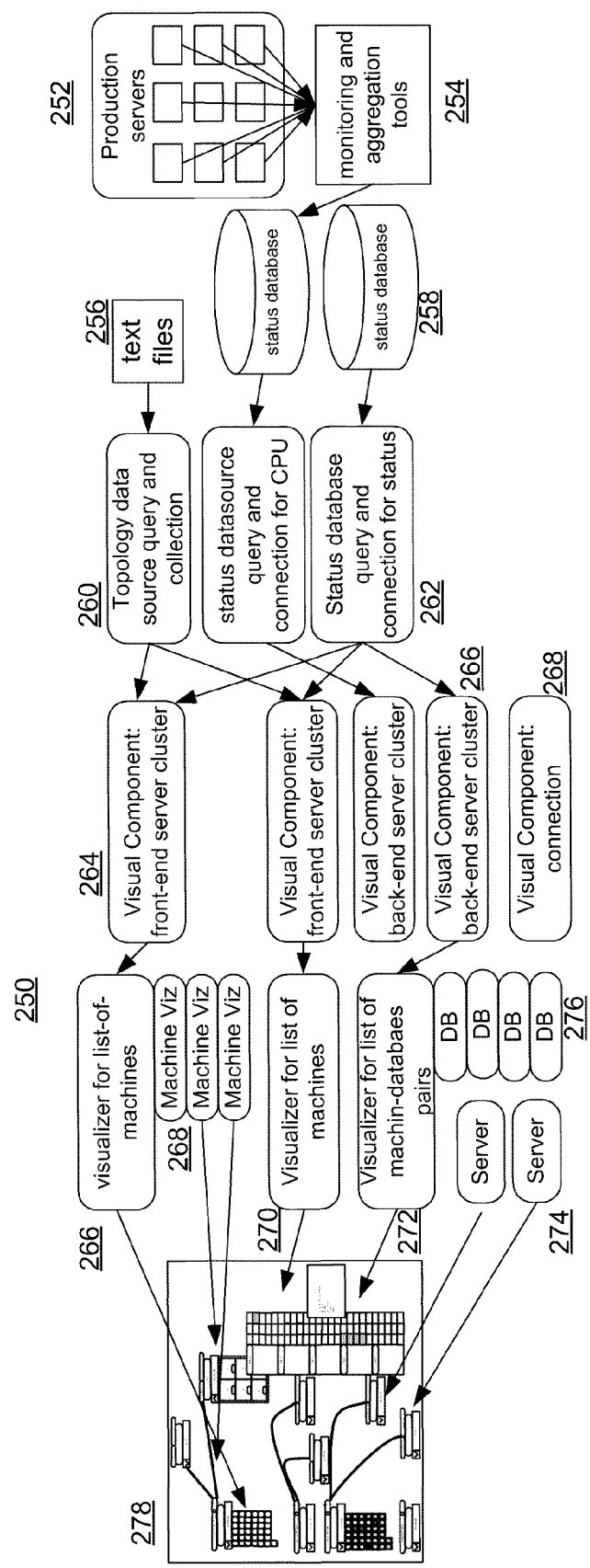
FIG. 3 shows a data model of one of embodiment of a data visualization system.

FIG. 3 shows a model 250 of one embodiment of a data visualization system. Areas in light gray might not require direct representation in a configuration file, while areas in white generally may be declared in the configuration file. The configuration file specifies underlying topology and status information. Generally, data is aggregated from many sources into components, and the components are then drawn as visualizers or user interface elements. Various production servers 252 (servers involved in a cloud service) supply status and performance data to a monitoring and aggregation tool 254 (a pre-existing collection system). The data is stored in data stores such as text files 256 (in this example they store topology data) and databases 258.

The model 250 is comprised of a number of types of objects implemented in the abstract by the visualization engine 124. Instances of the objects are instantiated according to the configuration file. To obtain data about the subject cloud service, different types of datasource objects are provided. In the example of FIG. 3, there are a topology datasource 260 and status datasources 262. Specific instances of datasources such as datasources 260 and 262 may be defined by the declarations of data sources 130 in a configuration file.

The datasources supply acquired data regarding a cloud service's status, topology, performance, etc. to a variety of visual components. Cloud services are typically constructed from a small number of different types of atomic components, some running service-specific code or configured in a service-specific manner: servers, databases, switches, load balancers, and/or others mentioned earlier. Some of these atomic components may be organized into groups or clusters, with components within a cluster performing an identical role (although with different data). Within and across clusters, there may be a high degree of redundancy for resilience. The topology data of a cloud service may identify redundant components. In general, topology data may identify particular hardware and software components of the cloud service, groupings and sub-groupings (perhaps with many levels of nesting) of the components, and relations between components, groupings, and/or sub-groupings. In the example of FIG. 3, specific classes of components are a front-end server cluster component 264, a back-end server cluster component 266, and a connection component 268. Each component object may correspond to an actual type of component of a cloud service being modeled. In sum, the component objects 264, 266, 268 are objects representing entities or components in the corresponding cloud service for which data is available.

Visualizers for instances of component objects are also part of the model 250. Visualizers are the actual user interface components that combine to form the user interface 278 that is used by an operator. In the example of FIG. 3 there is a visualizer for a list of machines 266, which is composed of visualizers for the respective actual machines listed. There is a visualizer for a list of machines 268 which has no visualizers 270 for the listed machines (the visualizer 270 may only present group information about a list of machines). Finally, there is a visualizer for a list of sets-of-machine-database-pairs, which has a visualizer for each server 274 and a visualizer for each database 276 hosted on the server. In one embodiment, visualizers may be implicitly instantiated based on explicitly declared data sources and component objects.

Embodiments

Figure 4:
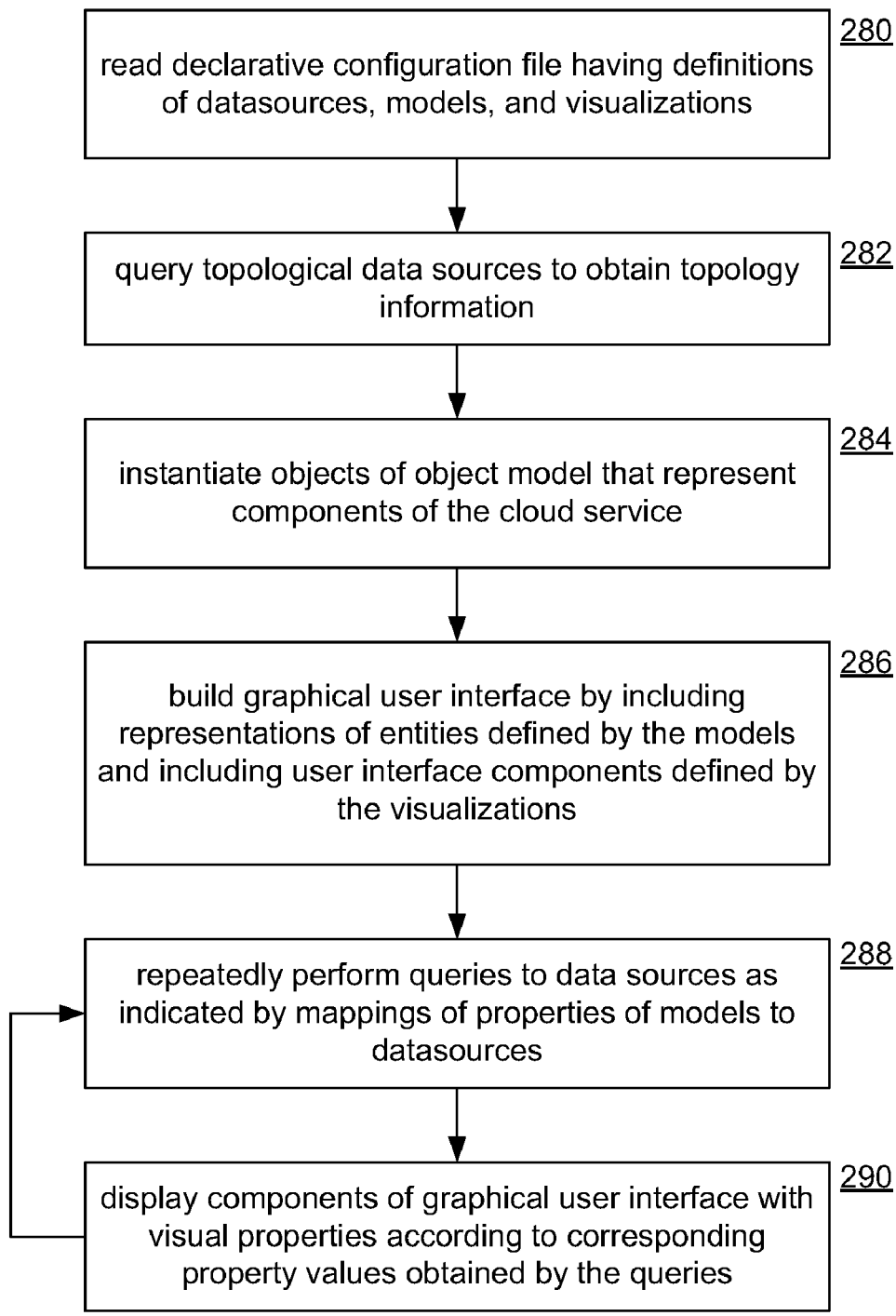
FIG. 4 shows a process for displaying a visualization according to a declarative configuration file.

FIG. 4 shows a process for displaying a visualization according to a declarative configuration file. The declarative configure file (see FIG. 5 for an example) has definitions of datasources, models, and visualizations (user interface components). The configuration file is read 280 and according to declarations in the configuration file, topological data sources are queried 282. Topological data may be data that identifies particular servers, software components, members of groups or aggregations, relations between components and/or groups or aggregations, and so forth. Names or identities of such components may also be included.

In accordance with the topological data, objects that represent components of the cloud service are instantiated 284. For example, if the topological data indicates a cluster of front-end servers, than an object representing the cluster is created. If topological data indicates the existence of specific servers, then corresponding objects are instantiated.

A graphical user interface is then built 286 to represent and visualize the components of the cloud service, including any clusters or groups, sub-clusters, individual server machines, and so forth. In one embodiment, instances of a component of the cloud service defined by the configuration file are represented by respective graphical user interface elements, which may be specified by the configuration file. Furthermore, interface elements are automatically arranged and grouped (by the visualization engine) according to the topological data. For example, interface elements representing database servers in a same set or cluster may be displayed in conjunction with or within an interface element representing the cluster (see FIG. 6 and interface elements representing a database set 324 and a server 326). Backup systems associated with one or more components may be visually connected to the same. Relations may also be implemented by hiding or exposing overlays or underlays. One type of cluster interface element may allow a user to interactively hide and expose constituent components of the cluster that were identified as members by the topological data. Interface elements of clusters of back-end servers affiliated with clusters of front-end servers may be displayed in a way that reflects their relation, for example, with a graphical connector connecting the clusters. Interface elements of servers in a cluster or sub-cluster may be displayed with or within the interface element of the containing customer or sub-cluster. Interface elements may popup corresponding status/performance/identity data during a mouse hover.

While user interface elements representing components may be visually arranged according to the queried topological information, the user interface elements may also present status and/or performance data also queried from the data sources according to the configuration file. Such information may be represented graphically in a variety of ways. Colors, status bars, gauges, graphs, scatter plots, and other indicia may be used to represent information. These types of representations may be used for any of the components, including both atomic components and groups of components.

Generally, interface elements representing a group or cluster visually present information about the cluster in the aggregate. For example, average values of a performance metric of members of the group (e.g., average CPU usage), a number of members of the group, counts of member components with particular status, and others. A group's interface element may present information about the status or performance metrics of its aggregated members. Averages, counts of machines of varying statuses, and so forth may be presented by a cluster's user interface element. A sub-cluster of components of a cluster (e.g., a sub-cluster of servers in a cluster) may be similarly represented. A user interface element for a group of groups may similarly display aggregate information about the member groups, thus providing a high-level measure of overall status or performance of a cloud service subsystem.

Atomic components such as database servers, hardware servers, web servers, routers, etc., may also be represented by corresponding user interface elements. Interface elements for these atomic components of a cloud service generally present status or performance information about the represented components, as well as indicia of the identity of the components (which may come from the topological data).

Having built 286 a graphical user interface composed of user interface elements, the specified queries may be repeatedly performed 288. Frequencies for performing a query may be specified in the configuration file, and different queries may be performed at different frequencies. As new topological and status/performance data is retrieved, the user interface elements are updated and displayed 290 to reflect the new data. If topology data changes then the selection and arrangement of user interface elements may change accordingly. If the status of a component such as a server changes, then the component's user interface element may change its appearance or indicia of the component to reflect the new status (such information may also cascade upward to affect a containing user interface element's aggregate information). For example, if a server goes from ordinary status to slow or unavailable, its user interface element may go from green to yellow or red. If the server is a member of a group and an interface element for the group visualizes a status-count of members, then the status-count may change. Changes in performance metrics are also given visual effect. By allowing (though not requiring) repeated updating and redisplaying of the status of the entire cloud service (perhaps not all at once), operators may be able to visually discern trends and relations as they occur (or as they are replayed, as discussed below).

Techniques for visualization of aggregate or group data will be explained further. An embodiment may include an aggregation framework, with visualizers defining mechanisms for summarization of the objects they contain, so the system or cloud service can be rendered at different scales. This may allow, among other things, zooming in on particular components, or zooming out to show an entire system. Furthermore, a mode of visualization or formatting for a displayed element may be automatically switched to one appropriate for a particular zoom level. For example, a size and level of information of a representation (e.g., an interactive widget) of a machine (or cluster) may vary according to the current zoom level. An icon may become smaller and less detailed as the view is zoomed out, thus accommodating display of increasing numbers of components.

As mentioned above, data of organizational units of a service (e.g., a cluster of machines, a peer network, a ring of servers, a collection of collections, etc.) may be aggregated and included in a visualization. A graphical user interface element may represent an organizational unit and may have with it indicia of the cumulative or aggregate data of its members. For example, a cluster may be represented by an interactive icon which may have graphical indicia of its members as a whole, such as percentage of units in service, average load of the members, median rate of transactions handled by a member, average availability, and so on. Groups of atomic components, as well as groups of groups, may be visualized in the aggregate and as discrete units of service. Aggregations can be displayed in a number of ways. For example, each object of a collection may be displayed, but the screen real estate dedicated to each may be automatically reduced. A histogram may be used to represent the distribution of values of a relevant metric for entities in the group (e.g., distribution of CPU utilization). Numbers may be used to represent a numeric summary of relevant metrics (e.g., mean, max, etc.).

Data aggregation may be performed by external data sources (as instructed by a visualizer's queries that are configured to request aggregate data), and/or by a visualizer itself aggregating information about components obtained from data sources. In some cases a visualizer may be able to aggregate data in a way that individual data sources are not configured for, such as grouping architectural units (e.g. pairings of front-end clusters and corresponding backend database clusters).

Finally, aggregation may be performed according to a declarative configuration file, thus allowing a visualization to dynamically adapt its aggregation of data (and visualizations thereof) even as the structure and makeup of a monitored service changes. In sum, a visualization framework may include an aggregation framework, with visualizers defining mechanisms for summarizing the objects they contain, thus allowing the monitored service to be rendered and visualized at different scales.

FIG. 5 shows an example configuration file 300. The configuration file 300 specifies visualization of two front-end servers, and colors them by CPU status information. A topological data source 302 is declared and specifies a connection to a particular database server, as well as a query and type of the query (TopoSQLDatasource). A status data source 304 is declared and specifies related parameters such as a frequency to re-perform the query. Values of the query are mapped to properties for use in user interface elements. For example, the status data source 304 also specifies how a queried value, CPUTIME, is to be displayed (as brightness). Finally, configuration file 300 has a model specification 306, specifying the components to be visualized.

FIG. 6 shows a display of an example user interface 318 (visualization) in operation at the ABCH cloud service. Three different front-end clusters 320 are represented with user interface elements. Each front-end cluster 320 communicates with a corresponding pair of back-end database clusters 322. Each database cluster 322 consists of 5-6 databases sets 324; each database set 324 contains eight servers 326, each hosting four primary and four secondary databases. The color or shade of a server 326 indicates CPU and disk utilization. Summaries (e.g., histograms of load status) provide awareness when detailed views are closed, and scatter 328 plots identify aberrant outliers. Time controls 330, 332 allow recent history to be replayed in loop fashion, making it easier for operators to correlate behavior of components across time. In practice, elements of user interface 318 will have color that may change to convey information. The background of user interface 318 may be black for better readability in the low-light of an operations center.

FIG. 7 shows another example of a user interface 340. In this example, topological information is conveyed by connectors 342 between topologically related components. A "tooltip" type of information panel 344 is displayed in response to a pointer hover over an interface element representing a database, and the panel 344 indicates status and performance information about the database, as well as its identity.

Figure 8:
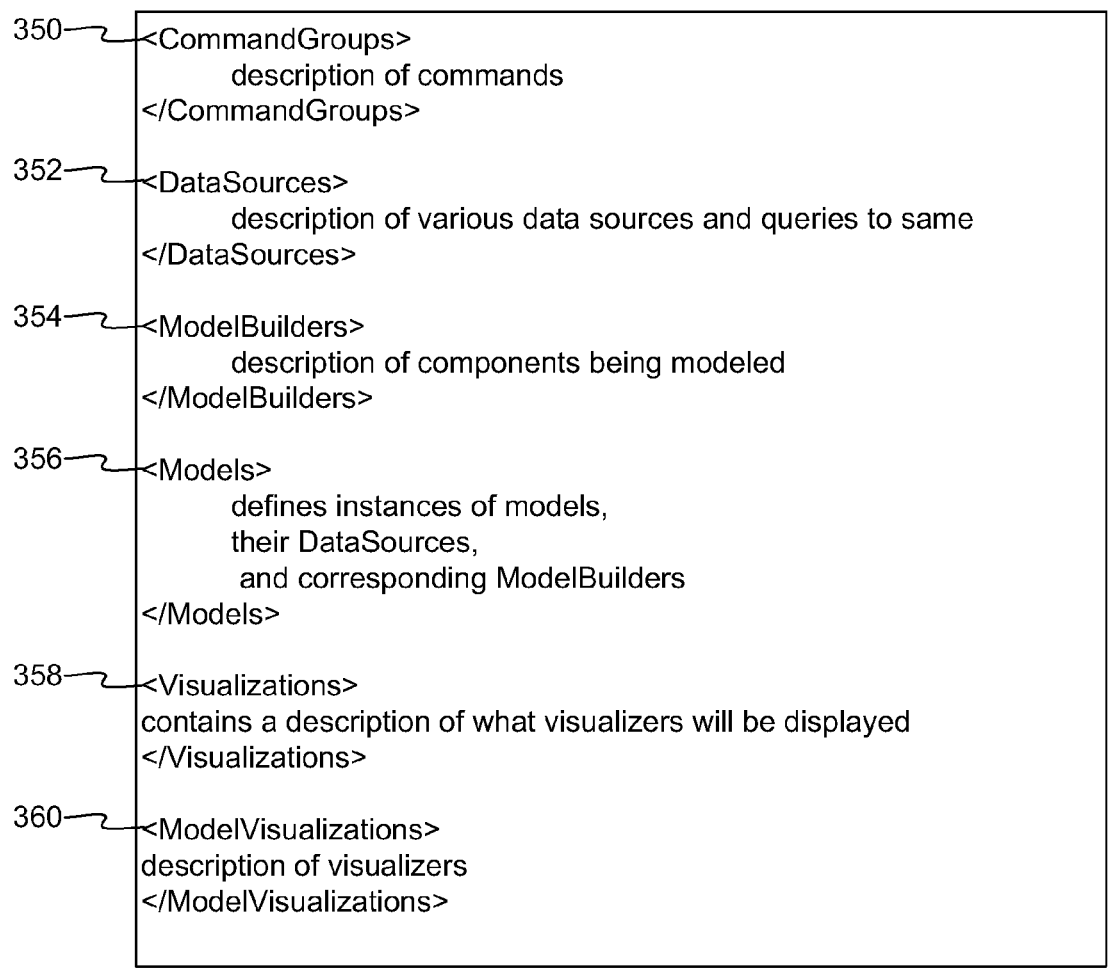
FIG. 8 shows a document map of a configuration file.

FIG. 8 shows a document map 346 of a configuration file. The example configuration file is written in XML. The configuration file starts with a CommandGroups element 350 with sub-elements that define various externally invocable commands, such as "ping". A DataSources element 352 contains definitions of various datasources. A ModelBuilders element 354 describes components being modeled. A Models element 356 defines instances of models, their datasources, and corresponding ModelBuilders. A visualizations element 358 contains declarations of what visualizers will be used. And a ModelVisualizations element 360 describes properties of the visualizers. Actual embodiments of a configuration file may be implemented using XAML in the Microsoft .Net environment.

Conclusion

Embodiments and features discussed above can be realized in the form of information stored in volatile and/or non-volatile computer or device readable storage media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method for generating a user interface for visualizing a cloud service based on status and performance data of the cloud service obtained from data stores, the data stores being updated with data about and from machine servers and software components of the cloud service, where the data stores are configured to be accessible by arbitrary applications other than the method, the method comprising:

executing on a processor a visualization engine configured to read and execute arbitrary different configuration files of arbitrary declarative program code and build and display respective different visualizations of the cloud service according to a configuration file, where a configuration file comprises arbitrary declarative code of a declarative language, the visualization engine parsing the configuration file and building and displaying a visualization of the cloud service according to the declarative code, the visualization comprising an interactive user interface comprised of user interface elements instantiated and arranged according to the configuration file, the user interface elements respectively representing components of the cloud service and aggregations of components of the cloud service, the user interface elements including displayable status and performance data, from the data stores, of the components and aggregations of components of the cloud service, the declarative code comprising:

declarative datasource code identifying particular of the data stores and parameters for accessing same, the identified data stores storing data about machines of the cloud service and data about topology of the cloud service;

declarative model code declaring an object model representing the cloud service, where objects represent components and aggregations of components of the cloud service; and declarative visualization code declaring the user interface elements of the user interface;

displaying the visualization of the cloud service; and receiving interactive input directed to the visualization and in response presenting performance and status information about the cloud service.

2. A method according to claim 1, wherein some of the components comprise server machines of the cloud service, respectively, and some of the components comprise software servers of the cloud service, respectively.

3. A method according to claim 1, wherein the declarative program code is in the form of code conforming to a markup language and the visualization engine is configured to parse and execute the code in the form of the markup language.

4. A method according to claim 1, wherein the configuration file specifies, declaratively, frequencies for periodically obtaining the status and performance data from the particular data stores, and periodically updating the visualization in accordance with new status and performance data obtained by the periodic obtaining.

5. A method according to claim 4, further comprising archiving historical data comprising data, and times thereof, obtained for the visualization from the particular data stores, wherein the visualization is configured to read the historical data and configure and display the visualization according to the historical data.

6. A method according to claim 4, wherein the data stores comprise at least database tables and flat files.

7. A method according to claim 1, wherein the configuration file further specifies data sources specifying respective queries to the particular data stores, and also specifies mapping information that maps the model to the data sources.

8. A method according to claim 1, wherein the configuration file further specifies mappings between the user interface elements and the objects of the model and the mappings are used by the visualization engine to construct the visualization.

9. One or more computer-readable storage media storing information to configure a computer to perform a process for displaying a visualization of a cloud service, the process comprising:

reading a declarative configuration file specifying data sources of the visualization, an object model of the cloud service, and visualization components that together form a user interface, the data sources specifying queries of specific data stores, where the data stores are updated with ongoing information about the cloud service collected from servers that make up the cloud service;

displaying the user interface in response to reading the declarative configuration file; and periodically obtaining performance and/or status data about the cloud service from the specified data sources and periodically modifying the appearance of the user interface to reflect the obtained performance and/or status data.

10. One or more computer-readable storage media according to claim 9, wherein the declarative configuration file comprises declarative source code that links data fields of the specified data sources with user interface elements of the user interface.

11. One or more computer-readable storage media according to claim 10, further comprising, based on model specification code in the configuration file, instantiating objects of an object model, the objects representing, respectively, servers and aggregations of servers of the cloud service.

12. One or more computer-readable storage media according to claim 9, wherein the user interface comprises interface elements that represent servers and aggregations of servers of the cloud service, and the displaying the user interface comprises providing the interface elements with non-textual visual attributes that periodically vary in appearance according to variation of the periodically obtained performance and/or status data about the cloud service.

13. One or more computer-readable storage media according to claim 9, wherein the user interface comprises graphical representations of the servers or collections thereof, the method further comprising allowing a user to zoom the graphical interface in and out, and in response changing display formats of the representations to correspond to a current zoom level.

14. One or more computer-readable storage media according to claim 9, further comprising aggregating information about a logical group of components and displaying a group user interface element that represents the logical group and which displays indicia of aggregated information, wherein when the user interface is zoomed out by a user, the user interface element is displayed to represent the logical group, and when the user interface is zoomed in the logical group is displayed in place of the group user interface element.

15. A method implemented by one or more computing devices, the method comprising the following steps that are performed by the one or more computing devices:

obtaining a configuration file comprised of declarative code that declares particular queries to particular status/performance data sources, the queries returning status and/or performance data about software and hardware components of a cloud service, and the configuration file also comprising declarative code that declares particular queries to topology data sources, the queries returning information identifying individual hardware and software components of the cloud service, topology information indicating logical groupings of the hardware and software components, and information indicating relations between the logical groupings;

in accordance with the topology information, instantiating objects linked to the topology information by the configuration file, where each object corresponds to a particular hardware or software component or logical grouping thereof that is identified by the topology information;

based on declarations in the configuration file that link objects to user interface elements, generating a user interface element for each of the instantiated objects; and displaying indicia of the status and/or performance data about the software and hardware components of the cloud service in the user interface elements that represent the respective software and hardware components.

16. A method implemented according to claim 15, further comprising repeatedly obtaining new status and/or performance data and redisplaying the indicia accordingly.

17. A method according to claim 16, further comprising archiving the repeatedly obtained status and/or performance data, reading the archived data, and repeatedly redisplaying the user interface elements according to the read archived data.

18. A method according to claim 15, further comprising displaying a user interface element representing a logical grouping of hardware or software components of the cloud service, and displaying the user interface element with indicia of an aggregation of the status and/or performance data of the components in the logical grouping.

19. A method according to claim 18, wherein a visualization engine that implements declarations of declarative code automatically lays out the user interface elements in a user interface.

20. A method according to claim 15, wherein particular queries of the configuration file specify arbitrary types and instances of data stores.

* * * * *